United States Patent [19]

Dressell, Jr. et al.

[11] 4,298,101
[45] Nov. 3, 1981

[54] SHOCK ABSORBER

[75] Inventors: Richard G. Dressell, Jr., Livonia; Robert J. Heideman, Westland, both of Mich.

[73] Assignee: Enertrols, Inc., Livonia, Mich.

[21] Appl. No.: 82,190

[22] Filed: Oct. 5, 1979

[51] Int. Cl.³ .............................................. F16F 9/44
[52] U.S. Cl. .................................. 188/285; 267/8 R; 188/287; 188/315
[58] Field of Search ............... 188/287, 286, 285, 299, 188/315, 322; 267/8 R

[56] References Cited
U.S. PATENT DOCUMENTS 4,059,175 11/1977 Dressell, Jr. et al. ............... 188/285
4,174,098 11/1979 Baker et al. ...................... 188/287 X Primary Examiner—Douglas C. Butler
Attorney, Agent, or Firm—Krass, Young & Schivley

[57] ABSTRACT

A shock absorber for providing a decelerating force employs a piston disposed in a cylinder acting to displace the hydraulic fluid through a programmed series of orifices disposed along the length of the cylinder, with turbulent flow of the hydraulic fluid through the orifices. An adjustment in the shock absorber characteristics is achieved by a sleeve slidably fit over the cylinder, the cylinder having a series of ports with the sleeve being formed with a corresponding series of encircling straight-sided grooves which extend transversely with respect to the radial planes of the cylinder, such that each groove defines a variable area orifice depending on the rotative position of the sleeve over the cylinder by the overlying of the groove and cylinder ports. In a first version, the grooves are shaped as rings, tilted with respect to the cylinder axis so as to form ellipses; and, in a second version, the encircling grooves are formed in a partial spiral with a connecting return leg to provide a greater than 180° metering range. Both configurations have groove areas greater than the orifice area to insure a low pressure condition in the groove such that the primary resistance to flow is defined by turbulent flow through the orifice.

7 Claims, 6 Drawing Figures

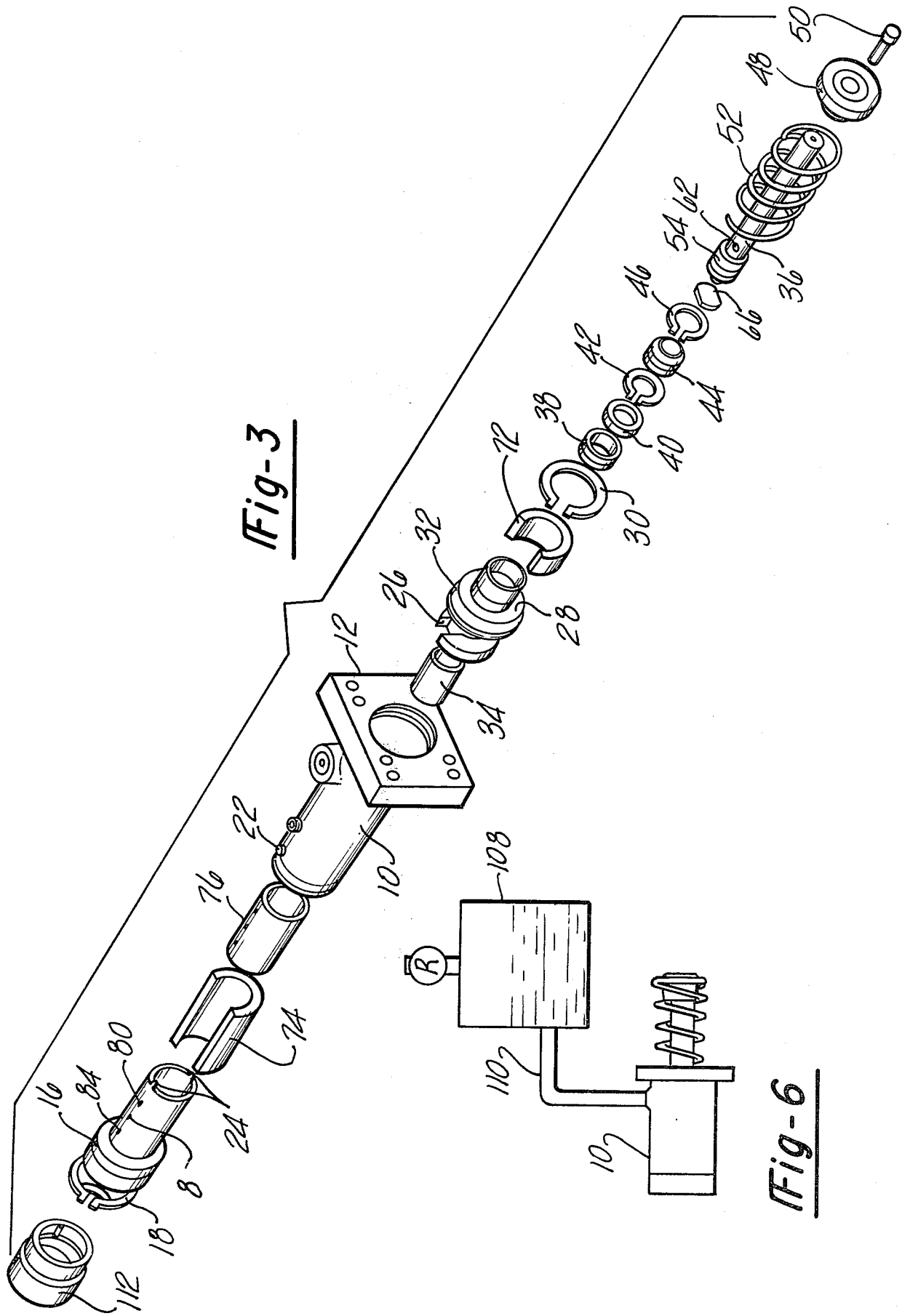

SHOCK ABSORBER

BACKGROUND DISCUSSION

Hydraulic shock absorbers have long been in widespread use for applications requiring the absorption of kinetic energy of a moving part. Such hydraulic shock absorbers employ the forcing of a hydraulic fluid through a resistance flow passage defining a resistance to fluid flow, with the energy dissipated through the movement of fluid through the restrictive passage.

This general arrangement has been refined in many ways in order to optimize the basic effect. One such refinement involves the use of orifices or knife edge flow in order to establish the resistance to hydraulic flow. Commonly, a piston is moved in a cylinder to force the hydraulic fluid through a relatively small diameter orifice such that fluid flow therethrough is turbulent. Turbulent flow dissipates energy much more effectively than does laminar flow.

In addition, the resistance to laminar flow is primarily a function of the viscosity of the hydraulic fluid, which viscosity will typically vary greatly with temperature.

Thus, the shock absorber will have greatly differing operating characteristics if laminar flow constitutes a substantial proportion of the resistance to movement of the parts connected to the elements through which the force is dissipated.

Another such design refinement includes the provision of a series of orifices, in the case of a piston and cylinder, in which the flow restriction increases as the piston approaches the end of its stroke. This is in order to achieve more or less deceleration force as the velocity of the piston increases. That is, at initial impact, the velocity of the relatively moving parts is generally much higher than as the piston approaches the end of its stroke. Since the resistance to flow is much higher at higher velocities due to viscous damping forces, a greater effective orifice is provided at the initial portion of the piston stroke in order to offset the effects of velocity and to produce a constant or linear net decelerating force acting on the connected parts.

In order to provide a variable range characteristic to such shock absorbers, it has heretofore been proposed, and shock absorbers have been designed, in which a variable orifice has been provided by providing a coacting sleeve which when rotated produces a variable area of each of the orifices in the series.

The prior art approach in general provided adjustment in such a manner that the flow through the grooves was upstream of the orifice restriction such as to pressurize the grooves at a relatively high pressure forcing the hydraulic fluid between the metering sleeve or tube and the surrounding cylinder. The flow between this clearance space being primarily laminar results in a substantial proportion of the hydraulic resistance being laminar flow, producing the aforementioned difficulties with regard to changing characteristics with varying temperature conditions.

In U.S. Pat. No. 4,059,175 of the present inventors, an improvement over this general arrangement is disclosed in which such high pressure groove condition is precluded. This was achieved by providing a groove formed on the sleeve interior having one side which was inclined at an angle to the axis of the cylinder. With the provision of a series of holes or ports in the piston, a variable area orifice was thus provided, depending on the rotational position of the surrounding sleeve due to a differing overlying area of the cylinder ports and the tube.

In this arrangement, the groove area downstream of the orifice formed by the overlying cylinder ports and groove are selected to be always greater than the area of the overlying groove at this particular position of the cylinder and sleeve.

This produces the advantageous result of a low pressure condition in the groove and virtually the entire hydraulic resistance is defined by the orifices. Thus, turbulent flow constituted the entire hydraulic resistance through the shock absorbers since leakage between the cylinders and sleeve was thereby eliminated.

The groove configuration in this patent is produced by the variable depth interception with the sleeve interior of a lathe tool having an inclined shoulder thereon such as to produce one edge of the groove which shifts axially in various rotative positions about the cylinder axis to produce the metering action by relative rotation of the sleeve over the cylinder ports.

While producing the aforementioned advantages, the cross sectional area of the groove necessarily declines as the orifice area declines.

While, as described therein, the groove area is always maintained to be greater than the cross sectional area of the orifice, nonetheless the larger the groove area, the less resistance to flow resulting in such lower pressure in the groove.

Thus, it would be advantageous if the groove area did not decline at any point of adjustment in the orifice sizes.

Furthermore, the flow down through the groove to the exhaust opening is essentially in a single direction, due to the groove geometry. It would further reduce the groove pressure if two directional flow could be achieved.

The particular machining process also requires control over the in-and-out depth of the cut of the tool as well as the geometry of the tool introducing two different factors which must be controlled to produce the required geometry of the groove.

It would of course be advantageous if the number of the geometry influencing factors in the machining process could be reduced while still providing a relatively low cost machining technique.

The metering grooves according to U.S. Pat. No. 4,059,175 also are of a variable width with the shallow ramped side producing the variation in width which in turn provides the variable area orifice, as the metering sleeve is rotated over the cylinder. This configuration particularly at the smaller area adjustment tends to reduce the knife edge configuration of the orifice formed by the overlay of the cylinder ports and the metering grooves.

It would be preferable for the groove side surface to not be adjacent the ports so as to maximize the knife edge configuration and the turbulence of the flow from the cylinder port into the metering groove.

Another advantage of the aforementioned patented shock absorber is the range of adjustment. Most such arrangements in the past allowed less than 90° of adjustment, whereas, in the design described in U.S. Pat. No. 4,059,175, a 180° adjustment range is possible. This enables rotation in either direction to provide such 180° adjustment. The increased range of course provides a more precisely controlled tailoring of the shock absorber characteristic and to a wider range of load applications.

It would of course be desirable to maintain or increase such range of adjustment while simplifying the groove machining techniques as well as maintaining maximum groove cross sectional area.

It would also be advantageous if such range could be increased beyond 180° to further enhance the capability of the shock absorber to varying load applications.

In this patent, there is also described the use of a single spiral groove which registers with the cylinder holes. While relatively simple to manufacture by thread forming or machining techniques, this relatively constrains the cylinder hole configuration which may be placed in phase with a constant pitch helix.

It is desirable to enable the cylinder holes to be placed to programmed locations in order to produce the linearizing of the decelerating force, and such spiral groove configuration inhibits the design control over the location of the cylinder ports.

Accordingly, it is an object of the present invention to provide a hydraulic shock absorber of the type including a piston displaceable within a cylinder forcing fluid through a series of orifices defined by the overlaying of a corresponding series of grooves formed on the inner diameter of the metering sleeve in which the groove configuration and the relationship of the orifices is such as to insure substantially the entire hydraulic resistance of the shock absorbers defined by turbulent flow through the orifices so formed.

It is another object of the present invention to provide such a shock absorber in which the groove cross sectional area is maintained at a maximum throughout the adjustment range defined by the variation in the orifice cross sectional area achieved by rotation of the overlying metering sleeve on the cylinder.

It is a further object of the present invention to provide such shock absorbers in which the groove configuration may be readily machined by relatively simple machining techniques and in which the groove geometry is relatively easily controlled during the machining process.

It is yet another object of the present invention to provide such a shock absorber in which a 180° and greater change of adjustment is provided.

It is still another object of the present invention to provide an orifice geometry which achieves maximized turbulent flow by a knife edge geometry.

SUMMARY OF THE INVENTION

These and other objects of the present invention, which will become apparent upon a reading of the following specification and claims, are achieved by a shock absorber of the general type described and including a piston moving within a cylinder with a series of ports formed in the cylinder sidewall at programmed points along the length of the cylinder and which ports are adapted to overlie a series of grooves formed on the internal diameter of the overlying metering sleeve with the groove configuration being such as to vary the orifice created by the overlying of the groove and the cylinder ports at various rotative positions of the sleeve on the cylinder.

According to the concept of the present invention, the grooves are formed to encircle the sleeve, forming separate rings about the sleeve and cylinder axis and which grooves are configured with relatively straight sides into the sleeve surface, but which vary in inclination and are inclined with respect to the radial planes of the sleeve and cylinder such that as the sleeve is rotated, the sidewall of the sleeve shifts in relative position with respect to the cylinder ports to produce the variable area orifice.

The groove configuration is such as to have a constant cross sectional area which is greater than maximum orifice size defined by the overlying cylinder ports and groove, i.e., the cylinder hole areas in the 100% open position.

In this latter situation, with the cylinder port lying directly over the groove, the cylinder hole itself defines the orifice restriction. This is of a smaller area than the groove cross sectional area measured transversely such as to insure that the hydraulic resistance of the shock absorber is defined substantially entirely by the turbulent flow through the orifice defined by the cylinder holes overlying the metering grooves.

In a first version, the grooves are configured as concentric rings which are inclined with respect to the axis of the cylinder and sleeve such as to be elliptical, disposed in relationship to the cylinder ports such as to provide 180° rotational range of adjustment by varying the degree of registry of the cylinder holes with the grooves.

In another version, the encircling groove ring is formed in a partial spiral of greater than 180° with a return leg completing the groove ring. The partially spiral configuration allows a greater than 180° range of adjustment.

Both versions enable two directional flow through the groove to the exhaust opening to further increase the effective groove area to handle the flow and minimize the groove pressure.

In the first version, lathe machining of the elliptical ring is carried out by axially moving the sleeve during machining to produce the elliptical relationship of the groove ring with the sleeve.

In the second version, an investment casting of the sleeve enables the partial spiral configuration of the groove rings.

The result is a groove configuration in which the cross sectional area is maintained at a maximum in all adjusted positions of the sleeve and cylinder. The elliptical ring version is relatively easily formed by machining techniques solely by the relative movement of the parts rather than by the lathe tool geometry.

Also, the cylinder holes define to a maximum extent a knife edge orifice since the groove sidewalls are square to the sleeve interior surface.

The use of separate encircling groove rings insures that the cylinder holes may be located at any point along the length of the sleeve to thus insure complete design freedom in locating the orifices in order to establish the linear or other desired force characteristic of the shock absorber.

DESCRIPTION OF THE DRAWINGS

FIG. 3 is an exploded perspective view of the major components of the shock absorber depicted in FIG. 2.

FIG. 6 is a side elevational view of an installation of the shock absorber according to the present invention with an external reservoir of operating fluid.

DETAILED DESCRIPTION

Figure 1:
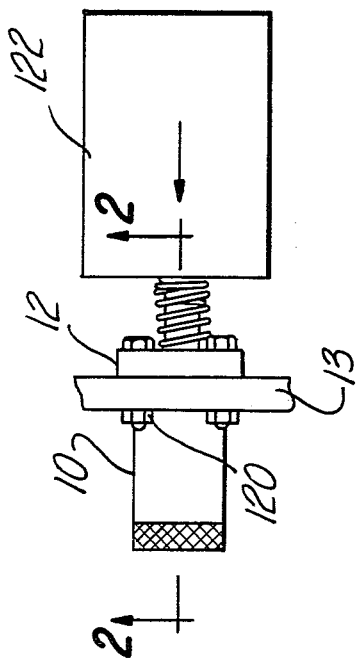
FIG. 1 is a side elevational view showing the installation of the linear shock absorber according to the present invention in a typical application.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the arrangement of components of the shock absorber according to the present invention is similar to that described in aforementioned U.S. Pat. No. 4,059,175, which is construed about a cylindrical tube 10. One end of the tube, which will be hereafter termed the forward end, has a radially extending metal flange 12 fixed to its outer diameter for the purpose of attaching the shock absorber to a part mounting surface, such as the wall 13 of FIG. 1.

The rear end of the tube 10 is closed off by a cylindrical cap 14. An O-ring 16 fitted in a groove of the outer perimeter of the rear cap 14 bears against the inner wall of the tube 10 to provide a fluid seal. A split steel retaining ring 18 fits in a groove in the inner wall of the tube 10 to secure the cap within a tube.

A tubular metering cylinder 20 is formed integrally with the rear cap 14 and projects forwardly into the tube 10. The outer diameter of the cylinder 20 is substantially smaller than the inner diameter of the tube 10 so that a volume is formed therebetween.

The rear cap 14 and cylinder 20 are normally secured against rotation within the tube by a set screw 22 which mates with a threaded hole in the wall of the tube, near the rear end, and bears against the outer diameter of the rear cap 14.

A pair of tabs or ears 24 project outwardly from the forward end of the cylinder 20. The tabs are not quite diametrically opposed but are displaced from one another by approximately 140° so that a wider spacing separates the two on one side than on their other side. The tabs 24 extend into a pair of radial slots 26 formed in the rear end of a piston rod bearing retainer 28 which seals the forward end of the tube 10. The retainer 28 is secured within the tube by a split retainer ring 30 fitted in a groove in the inner diameter of the tube 10, near its forward end. An O-ring seal 32 fits in a groove in the outer diameter of the retainer 28.

A cylindrical sleeve bearing 34 is press-fitted within a central cavity in the retainer 28 and acts to slidingly support an elongated piston rod 36 that projects out of the forward end of the assembly. The retainer 28 has a forward cylindrical extension beyond the sleeve bearing 34 to accommodate a plastic rod seal 38. The rod seal 38 bears against a shoulder formed in the retainer 28 and is secured by a retainer member 40 which is in turn secured between the retaining ring 42 and a second retaining ring 46 fitted within another groove in the retainer 28.

At its forward end, the piston rod 36 carries a button 48 secured by a screw 50 threaded in a hole at the end of the piston rod. The button 48 acts to bear against a machine part to be controlled by the decelerator. A spiral spring 52 extends between the rear side of the button 48 and the retainer ring 30 and acts to return the piston rod 36 to its normal extended position after the machine part is moved away from the unit.

A piston 54 is formed integrally with the rear end of the piston rod 36. A groove on the outer diameter of the rear end of the piston carries a piston ring 56 which bears against the inner diameter of the cylinder 20. The piston is formed with a central aperture 58 opening on its rear end and communicating at its forward end with a central cavity 60. That in turn communicates with a radially extending aperture 62. The concave surface between the central aperture 58 and the smaller aperture 60 acts as a seat for a ball check valve 64. A valve retainer 66 is supported rearwardly of the ball by a retaining ring 68. When the piston moves rearwardly under the influence of a force exerted on the button 48 by a machine part, the central cavity 60 is sealed by the ball check valve 64 and, when the piston moves in the forward direction under the force of the spiral spring 52, a free flow path is established through the apertures 58, 60 and 62.

The aperture 62 communicates with the radial slots 26 in the rear end of the retainer 28 and through those slots to an annular slot 70 formed in the outer diameter of the retainer. The annular slot 70 is filled with an annular accumulator pad 72 formed of a cellular plastic filled with nitrogen to give it a high degree of resilience.

A similar accumulator pad 74 is disposed within the inner diameter of the tube 10, forwardly of the rear cap 14, surrounding the cylinder 20. This accumulator system also has fluid communication with the radial slot 26.

A sleeve 76 surrounds the outer diameter of the cylinder 20 and has its outer surface in contact with the inner diameter of the accumulator pad 74. The sleeve 76 is locked in position relative to the tube 10 by a pin 78 extending radially inward from the outer wall of the tube and passing through a hole formed in the accumulator pad 74.

Three fluid ports 80, 82 and 84 are formed radially through the wall of the cylinder 20. The three ports are in longitudinal alignment with one another and the spacing between the ports 80 and 82 is greater than the spacing between the ports 82 and 84. More than three ports may be employed in alternative embodiments and generally the spacings are arranged at exponentially decreasing distances in the direction of the rear of the cylinder. The ports are circular in cross section.

The fluid ports 80, 82 and 84 are located adjacent to three encircling ring grooves 86, 88 and 90 formed into the interior surface of the sleeve 76. These three ring grooves 86, 88 and 90 are spaced along the length of the sleeve 76 at the same spacing as the fluid ports 80, 82 and 84 so that when the sleeve 76 is disposed over the cylinder 20, the grooves overlie, to some degree, the respective ports. The extent to which they overlie the ports is controlled by the rotational or angular relationship of the sleeve 76 with respect to the cylinder 20.

The configuration of each of the ring grooves 86, 88 and 90 is such as to encircle the cylinder and sleeve axis, to each form a closed fluid circuit between the fluid ports 80, 82 and 84 and a series of exit openings 102 associated with each of the ring grooves 86, 88 and 90.

Figure 2:
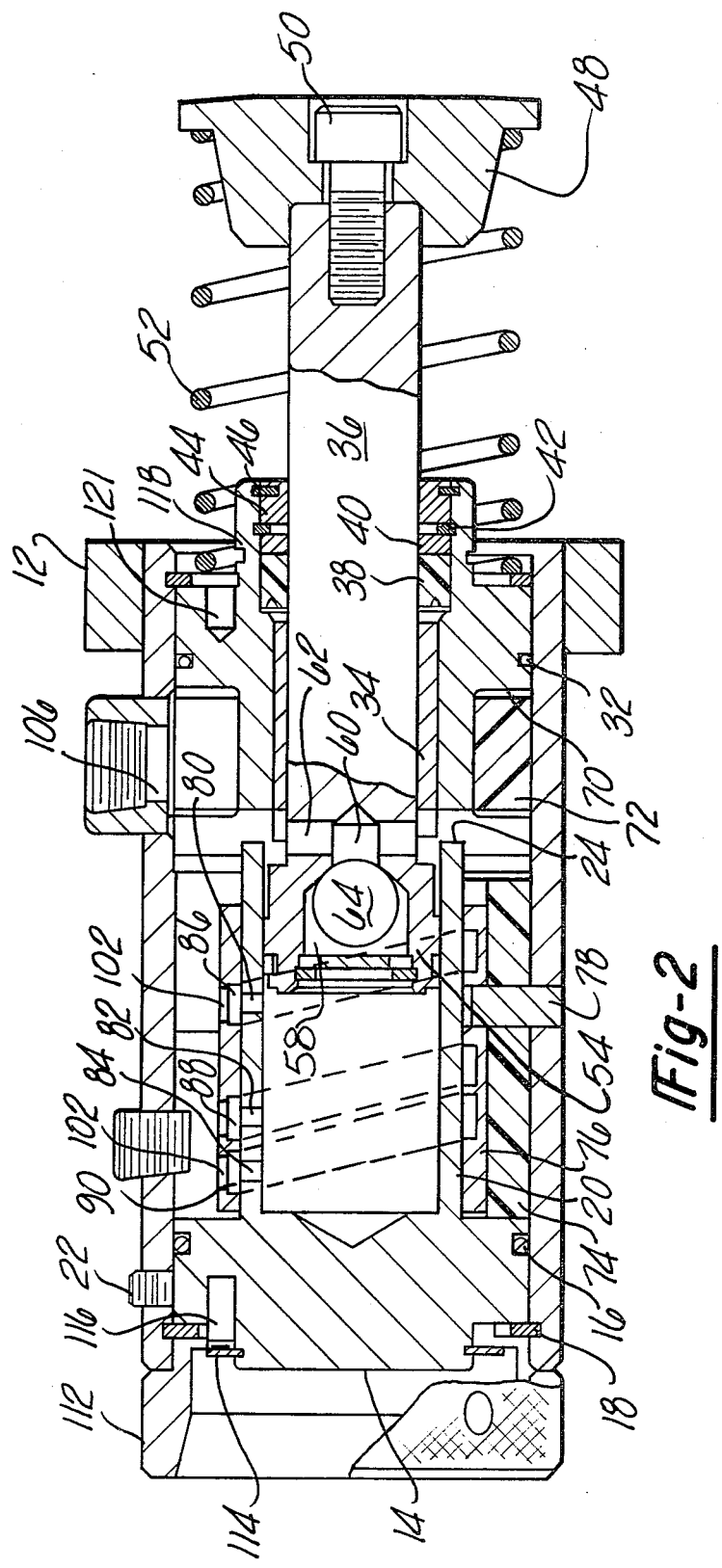
FIG. 2 is a longitudinal partially sectional view of the shock absorber depicted in FIG. 1, the section taken along the lines 2—2 in FIG. 1.

Ring grooves 86, 88 and 90, according to the embodiment depicted in FIG. 2, extend transversely with respect to the radial planes of the cylinder and sleeve such as to comprise elliptical rings. Such elliptical shape can be produced by a lathe cutting tool and an appropriate cam control over the relative axial position of the tool and the sleeve 76.

Each of the ring grooves 86, 88 and 90 is a square-sided configuration extending into the interior surface of the sleeve 76 in distinction to the sloping side of the aforementioned U.S. Pat. No. 4,059,175, and of a cross sectional area greater than the cross sectional area of the fluid ports 80, 82 and 84. Thus, the orifice formed by the overlying of the fluid ports 80, 82 and 84 and the ring grooves 86, 88 and 90 is necessarily always of smaller cross sectional area than the cross sectional area of the groove.

The major restriction of the fluid flow caused by movement of the piston 54 in the cylinder 20 provides the substantially knife-edge orifice defined by the overlying of the respective ports and grooves. This thus insures that the hydraulic resistance is primarily generated by turbulent flow which as noted is substantially independent of the temperature and viscosity of the fluid.

Each of the ring grooves 86, 88 and 90 is depressurized. That is, they are of much less pressure than the pressure generated within the cylinder by movement of the piston 54 and thus the tendency for leakage of laminar flow intermediate the cylinder 20 and the sleeve 76 is greatly reduced.

It is also noted that the straight-sided configuration of each of the ring grooves 86, 88 and 90 is of the same cross sectional area and is not reduced with increasing and decreasing orifice area with angular adjustment of the sleeve 76.

Figure 4:
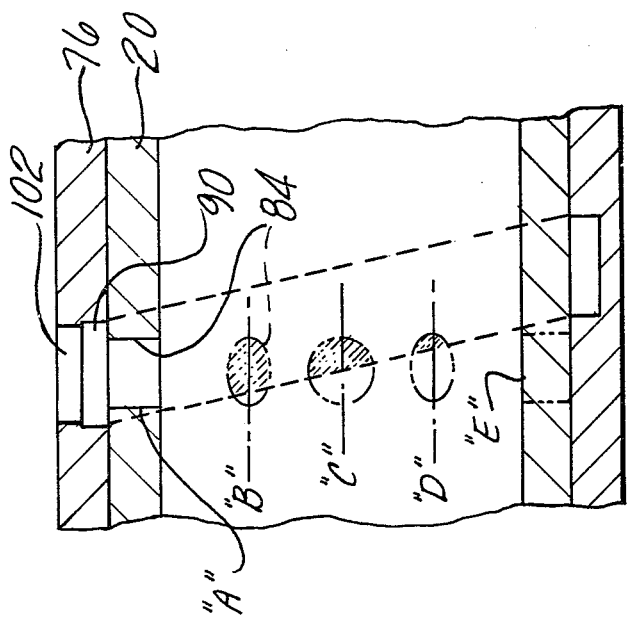
FIG. 4 is an enlarged fragmentary view of the shock absorber depicting in detail the groove geometry and also indicating the adjustment relationship of the cylinder holes through the range of adjustment of the sleeve with respect to the cylinder.

Referring to FIG. 4, the adjustment orifice relative geometry can be appreciated. In the angular adjusted position corresponding to port 84 location "A," the port 84 is substantially centered over the groove 90 such that the port 84 defines the restriction by its own cross sectional area.

Upon rotation to position "B," the port 84 has a small portion of its leftmost side extending over the lefthand edge of the groove 90 such as to partially reduce the size of the orifice restriction, and this is now constituted by the area of the port 84 which overlies the portion of the area of the groove 90. The shifted angular position of rotation of the sleeve 76 and the elliptical or radially inclined configuration of the groove 90 yields this change in relative position of the groove 90 and the port 84.

Similarly, movement to positions "C" and "D" successively increases the portion of the port 84 overlying the interior of the sleeve 76 and decreases the portion which overlies the groove 90, as the sleeve 76 is rotated angularly with respect to the cylinder 20.

Finally, in position "E," the port 84 has moved entirely beyond the groove 90 such as to shut off flow entirely.

A reversing of the adjustment is reached at a point of 180° from the initial fully opened position "A." Upon continued angular adjustment in the same direction of the sleeve 76 with respect to the cylinder 20, a reverse cycle of adjustment occurs, with increasing effective orifice size and decreasing resistance force to movement of piston 54 and cylinder 18.

Each of the ring grooves 86, 88 and 90 is spaced exponentially along the length of the cylinder 20, as are the corresponding ports 80, 82 and 84 in order to achieve the constant force as developed in the above-cited patent, i.e., the progressive closing off of the ports 82 and 84 produces an increasing resistance which offsets the velocity of movement of the piston 54 such as to generate a substantially constant or linear force throughout the stroke of the piston 54 and the cylinder 20.

Each of the grooves 86, 88 and 90 is of square sided configuration and the change in overlying relationship of the ports 80, 82 and 84 is produced by an inclination of the entire circling metering grooves with respect to the radial planes, with the circumference of the sleeve 76 passing through the respective ports 80, 82 and 84, rather than a changing geometry of the groove, with the groove being substantially aligned with the circumferential line passing through the ports as in the above-cited patent.

This produces several advantages over that design. Firstly, the area of each of the grooves 86, 88 and 90 is not reduced in varying adjusted position of the sleeve 76. That is, the full cross sectional area is available for accommodating flow after having passed through the orifice defined by the port overlying the respective groove. This further enhances the low pressure or "depressurized groove" feature since the groove along its transverse direction provides an absolute minimum in resistance to flow.

Also, since the grooves extend 360° at full depth, two directional flow is achieved from the orifice to the particular exhaust hole.

Thus, this enhances the depressurization feature and even further minimizes the tendency for leakage flow intermediate the cylinder 20 and the sleeve 76.

In addition, in producing such groove structure geometry, the necessity for the interaction of the shape of the lathe cutting tool and the geometry of the resulting groove is not cutting tool geometry dependent, i.e., the cutting tool and the sleeve 76 are relatively moved axially during the lathe cutting operation to thereby produce the groove geometry. The metering inclination of the grooves is not dependent on the tool geometry, but rather only on the accuracy with which this relative axial displacement has taken place to thus render an accurate groove geometry less difficult.

Finally, the sidewall of the grooves 86, 88 and 90 extends normally away from the sidewall of the respective ports 80, 82 and 84 to further enhance the knife edge nature of the orifice so formed maximizing the tendency for turbulent flow to be established through the overlying orifice.

The encircling elliptical groove rings may be located at any point along the longitudinal axis to thus allow complete design freedom in producing a particular operating characteristic insofar as the progressive closing off of orifices is concerned. That is, for example, to establish a linear flow by the exponential spacing therebetween.

The manufacturing process for producing the sleeve 76 while being advantageously carried out by turning machining process such as to to minimize the machining may also be carried out by a relatively more expensive process such as investment casting. If such manufacturing techniques are employed, a further improvement can be made in the groove geometry.

Figure 5:
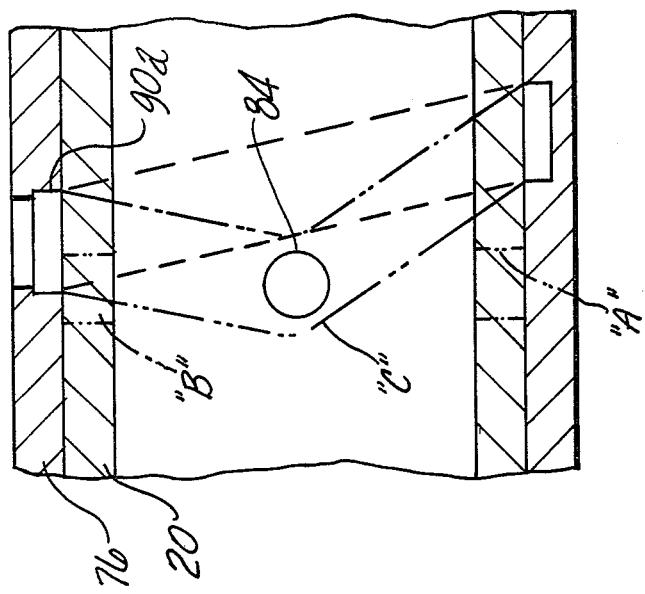
FIG. 5 is a fragmentary view of a portion of the shock absorber depicting an alternate groove geometry.

Referring to FIG. 5, one such improvement is indicated in which a groove 90A is provided which is partially in spiral form as indicated from point "A" around to the 180° point "B" and thence to an intermediate point "C" from the backside as viewed in FIG. 5 of the sleeve 76.

At this point, a return leg from point "C" to point "A" returns from the spiral location to point "A." Such geometry is achievable by a cast-in groove 90A. The entire spiral range from point "A" to point "C" is now available for metering adjustment such as to provide a finer degree of adjustment and/or a greater range of metering adjustment, i.e., such as 270° or greater.

Each of the groove geometries have in common the feature of a constant cross sectional configuration of an area which is greater than the greatest area produced by overlying ports with the grooves and with the groove itself inclined with respect to the radial planes at the point whereat the corresponding port is located such that upon relative rotation of the sleeve 76 and the cylinder 20, a shifting relationship between the port is generated which tends to vary the position overlying the port in the groove.

The angular orientation of the cylinder 20, relative to the sleeve 76, which is fixed within the tube 10 by the pin 78, may be adjusted by means of an externally knurled cylindrical adjustment member 112 that may be attached to the rear cap 14 by a split ring 114. A pin 116 passes through adjustment member 112 to align it in a hole in the rear cap 14.

Alternatively, the same adjustment member may be attached to the front end of the retainer 28 through use of ring groove 118 and a pin socket 121. The adjustment member 112 may be removed to prevent undesired readjustment of the orifice size.

The tube 10 is equipped with a port 106 in its sidewall, which communicates with the interior volume adjacent the accumulator pad 72. This port may be plugged so as to restrain the fluid flow within the tube 10 or it may be used to connect the interior volume to an external accumulator 108, via a conduit 110, as illustrated in FIG. 9. This arrangement allows for a more efficient dissipation of the heat induced in the hydraulic fluid as a result of the energy absorbed from the decelerating member.

In use, the shock absorber is attached to a wall 13, by bolts 120 which pass through the flange 12, as illustrated in FIG. 1. The piston is positioned to receive the impact of a moving part 122 and exert a linear decelerating force on the part. During the rearward motion of the piston, fluid is forced through the ports 80, 82 and 84 in the cylinder through a metering orifice created by the interaction of the outer diameter of these ports with the adjacent section of the grooves 86, 88 and 90, respectively, in the sleeve 76. The ports are successively closed off as the piston moves down the cylinder maintaining the decelerating force relatively constant. The fluid then moves along the groove and passes out of the exit openings 102 and compresses the accumulator pads 72 and 74 or passes out through the port 106 to external accumulator. When the moving part 122 moves away from the shock absorber, the spring 52 returns the piston to its forward position and the valve in the piston formed by the ball check valve 64 moves against the valve retainer 66 so that fluid can freely flow from the accumulator back into the interior volume of the cylinder.

The tabs 24 on the forward end of the cylinder 20 allow the piston 54 to be inserted in the cylinder without the use of a piston ring holder, in the manner previously described. The tabs 24 mate with the radial slots 26 in the retainer 28 to insure a unique alignment to the assembly.

Accordingly, it can be appreciated that the above-recited objects of the present invention have been provided by the particular groove geometries depicted, i.e., an adjustment of the overlying groove does not produce a corresponding decrease in cross sectional area of the groove. This maximizes the low pressure flow through the groove. At the same time, complete design freedom in setting the location of the encircling groove rings is achieved. The groove geometry is produced without the critical affect of the tool geometry and can be achieved by lathe turning machining processes.

In the case of the second embodiment, a greater than 180° of adjustment is afforded while at the same time maintaining the full cross sectional area available for flow downstream of the orifices.

The embodiments of the invention in which an exclusive property or privilege is claimed are defined as follows:

1. A device for applying a force to a moving member so as to decelerate the member, comprising:
   a tubular cylinder having a plurality of ports formed through its wall which are spaced relative to one another along the longitudinal axis of the cylinder;
   a piston slidable within the cylinder and means for mounting said cylinder and said piston with respect to said moving member to cause said piston to slide in said cylinder by movement of said member;
   a sleeve having an interior wall surrounding the cylinder and having a number of holes formed in it equal to the number of ports formed through the cylinder and spaced relative to one another longitudinally along the length of the sleeve at the same spacing as the port in the cylinder, and further having a plurality of corresponding grooves formed in the interior wall of the sleeve, each groove being in substantial alignment with one of the holes in the sleeve, each groove being of substantially constant cross sectional configuration and having a cross sectional area greater than the area of said cylinder ports;
   each of said grooves extending transversely to the radial planes of said sleeve, said sleeve disposed over said cylinder and said sleeve and grooves located so that each groove overlies a respective one of said cylinder ports to a varying degree as said sleeve and cylinder relative angular position is shifted by relative rotation therebetween;
   a volume exterior to said sleeve, the holes in said sleeve providing fluid communication with said groove and the exterior volume.

2. The shock absorber device according to claim 1 wherein each of said grooves is formed with sides square to the interior sleeve surface and of constant width and depth.

3. The shock absorber device according to claim 2 wherein each of said grooves is formed in rings located concentrically with respect to said cylinder and sleeve axis and inclined with respect to said radial planes to form ellipses.

4. The shock absorber device according to claim 3 wherein said inclination of each of said groove rings produces said variance in said degree of overlie from a condition of zero overlie to complete overlie with a shift in position of 180° between said cylinder and said sleeve.

5. The shock absorber device according to claim 1 wherein each of said grooves is formed in a partial spiral extending about said cylinder and sleeve axis and having an intermediate connecting section joining said ends of said partial spiral.

6. The shock absorber device according to claim 5 wherein each of said grooves is formed of a square-sided groove of constant depth and width.

7. The shock absorber device according to claim 5 wherein said spiral extends for 270° about said sleeve axis and wherein said inclination of each of said grooves spiral section produces said varying in degree of said overlie throughout said 270° as said sleeve is rotated relative said cylinder.

* * * * *